United States Patent [19]
Valentine

[11] 3,841,590
[45] Oct. 15, 1974

[54] HEAD RESTRAINT APPARATUS
[75] Inventor: Gordon A. Valentine, Denver, Colo.
[73] Assignee: Stanley Aviation Corporation, Aurora, Colo.
[22] Filed: May 11, 1973
[21] Appl. No.: 359,480

Related U.S. Application Data
[63] Continuation-in-part of Ser. No. 165,238, July 22, 1971, abandoned.

[52] U.S. Cl......... 244/138 R, 2/2.1 A, 244/122 AD, 244/143
[51] Int. Cl............................................. B64d 11/00
[58] Field of Search........ 244/122, 121, 137 P, 138, 244/141, 143, 151; 2/2.1 R, 2.1 A, 6

[56] References Cited
UNITED STATES PATENTS

| | | | |
|---|---|---|---|
| 3,074,669 | 1/1963 | Bohlin | 244/122 AG |
| 3,099,261 | 7/1963 | Doss et al. | 244/122 B |
| 3,128,469 | 4/1964 | Lobelle | 2/6 |
| 3,329,464 | 7/1967 | Barwood et al. | 244/122 B |
| 3,355,127 | 11/1967 | Stanley et al. | 244/122 AD |

FOREIGN PATENTS OR APPLICATIONS

| | | | |
|---|---|---|---|
| 1,158,494 | 7/1969 | Great Britain | 2/6 |
| 749,070 | 5/1956 | Great Britain | 244/151 R |

Primary Examiner—Trygve M. Blix
Assistant Examiner—Galen L. Barefoot
Attorney, Agent, or Firm—Strauch, Nolan, Neale, Nies & Kurz

[57] ABSTRACT

A head restraint device comprising a plurality of flexible, elongated elements which are positioned in the region of a man's head for deployment to a tensioned or taut head-restraining condition when the man is forcibly removed from an aircraft or other vehicle by a rocket escape apparatus.

11 Claims, 16 Drawing Figures

PATENTED OCT 15 1974

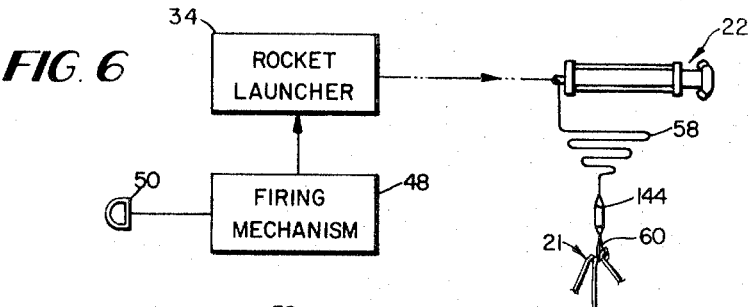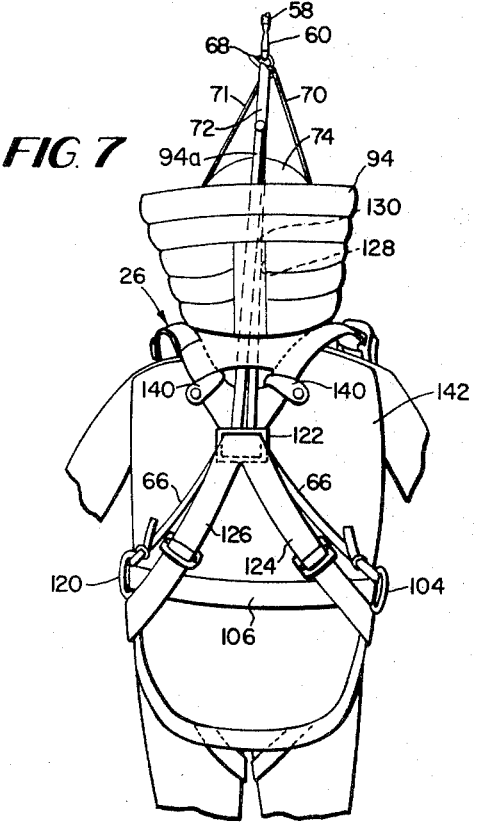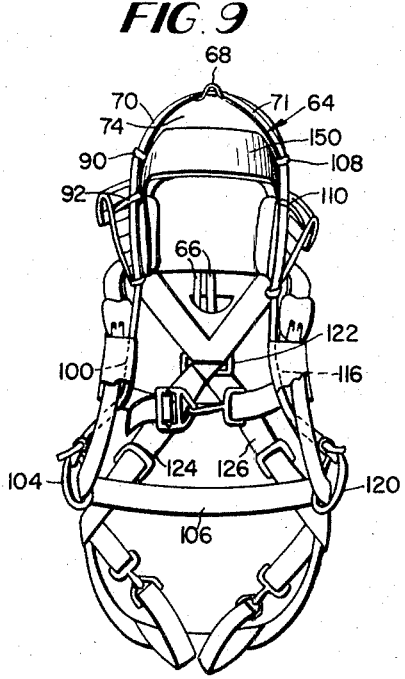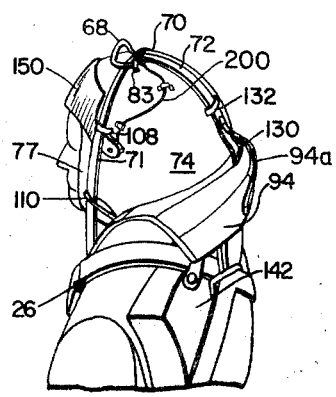

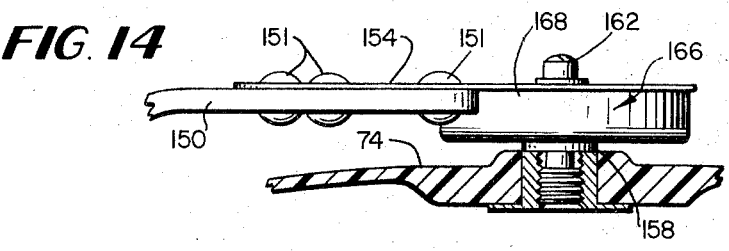
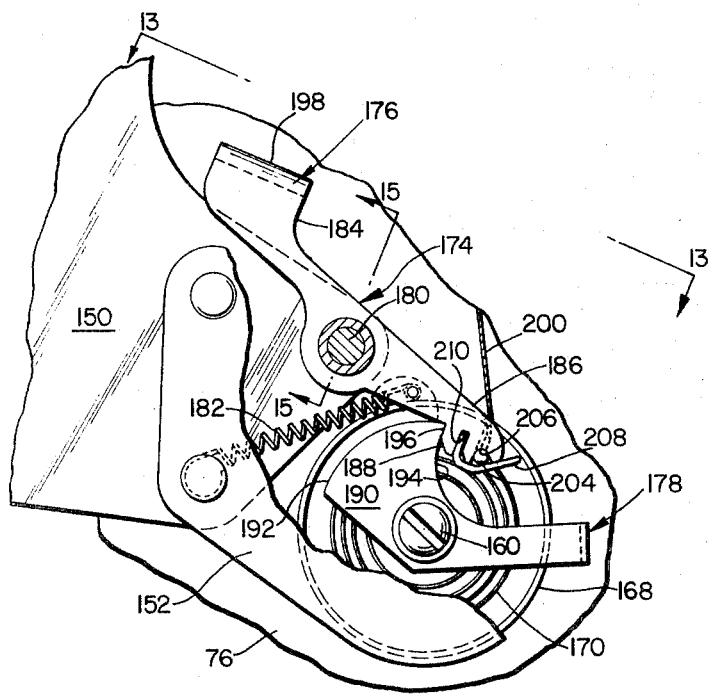
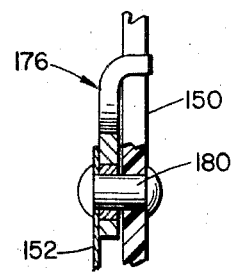
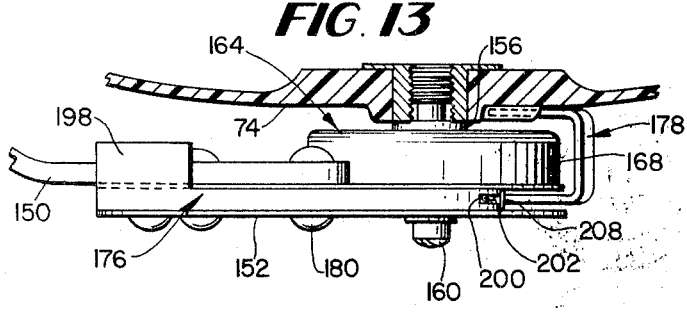
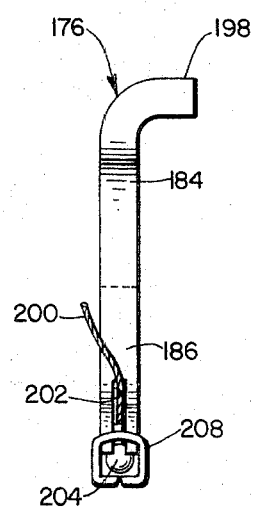

3,841,590

HEAD RESTRAINT APPARATUS

This is a continuation-in-part of application Ser. No. 165,238 filed on July 22, 1971, now abandoned for Head Restraint Apparatus.

This invention relates to head restraint apparatus and is particularly concerned with head restraint equipment that is used in conjunction with systems for effecting the forcible escape of an occupant from a vehicle.

BACKGROUND

During rocket powered ejection or extraction of a man from an aircraft that is travelling at relatively high speed (i.e., above 150 knots), it is important to support the man's head against airload to avoid injury to the man. In an ejection seat the support for the man's head is customarily provided by a contoured headrest. Headrests of this type support the man's head against rearward motion and are generally effective when the man's escape route is into the relative wind from a forwardly facing seat.

In comparison with the foregoing escape mode, there is a requirement for restraining motion of the man's head in escapes that are laterally of the aircraft. During the critical phase of laterally emerging from the aircraft, the relative wind will usually be applied to the side of the man's head. What is desired, therefore, is a multi-directional restraint which is effective at least during the time the man is emerging from the aircraft and particularly during the time in which the airload is not applied uniformly to his entire body.

SUMMARY & OBJECTS OF INVENTION

With the foregoing in mind, it is a major object of this invention to provide a novel head restraint device to support the man's head against shearing forces that result from non-uniformly applied airloads.

It also is a primary object of this invention to provide a novel head restraint device that supports the man's head against airloads applied to the side of his head as he emerges from the aircraft or other vehicle.

According to this invention, the head restraint device of this invention comprises a plurality of flexible, elongated elements that are positioned in the region of the man's head and are deployable or extendible to a tensioned or taut, head-supporting condition. In the preferred embodiment of this invention these extendible head-supporting elements form a part of an extendible towline or pendant assembly which connects an escape rocket to the man's harness. The rocket is carried by the aircraft or other vehicle and is positioned for flight away from the vehicle. Upon flight of the escape rocket from the vehicle, the towline assembly, including the head-restraint or head-supporting elements, is pulled taut or tensioned to pull the man from the vehicle and at the same time to support the man's head against the airload as he emerges from the vehicle.

In the preferred embodiment of this invention the head-supporting elements are positioned along the exterior of the man's protective helmet to support the man's head against sideward motion in either direction and also to support the man's head against rearward motion.

According to another feature of this invention one or more of the head-supporting elements, upon being extended to a tensioned, head-supporting condition, erects a head-supporting collar to provide further support against generally rearward motion of the man's head. This erectable collar is worn by the man and is normally stowed in relaxed, unerected condition behind the man's head.

Thus, another object of this invention is to provide a novel arrangement in which a collar is erected to a head-supporting position by flight of an escape rocket away from the aircraft or other vehicle.

According to still another aspect of this invention the visor on the man's helmet is advantageously displaced from its retracted position to its-eye-shielding position when the head-supporting elements are extended. This may be accomplished by latching a spring-biased visor in its retracted position and by connecting the latch to a part of the head-restraint assembly of this invention so that it will release the visor when the rocket applies a tensioning force to the head-supporting elements.

Thus another object of this invention is to provide a novel force-responsive arrangement for enabling the man's visor to be displaced to its eye-shielding position as the man emerges from the aircraft or other vehicle.

Further objects of this invention will appear as the description proceeds in connection with the below-described drawings and appended claims.

DESCRIPTION OF DRAWINGS

FIG. 6 is a schematic diagram of the apparatus for forcibly removing the man from the aircraft;

FIG. 7 is a fragmentary rear elevation of the man and his head restraint device and harness assembly;

FIG. 8 is a fragmentary perspective view showing the left side of the man's helmet and his head restraint device;

FIG. 9 is a generally front elevation of the man's harness and of head restraint device of this invention;

FIG. 12 is an enlarged fragmentary left hand side elevation similar to FIG. 10, but with the visor mounting plate partially broken away to illustrate details of the visor latching mechanism of this invention;

FIG. 13 is a section taken substantially along lines 13—13 of FIG. 12;

FIG. 14 is a section taken substantially along lines 14—14 of FIG. 11;

FIG. 15 is a section taken substantially along lines 15—15 of FIG. 12; and

FIG. 16 is a section taken substantially along lines 16—16 of FIG. 12.

REFERENCES INCORPORATED BY REFERENCE

| U.S. Patent No. | Patentee | Issue Date |
| --- | --- | --- |
| 3,424,409 | R.M. Stanley | Jan. 29, 1969 |
| 3,361,397 | G.A. Valentine | Jan. 2, 1968 |

DESCRIPTION

Figure 1:
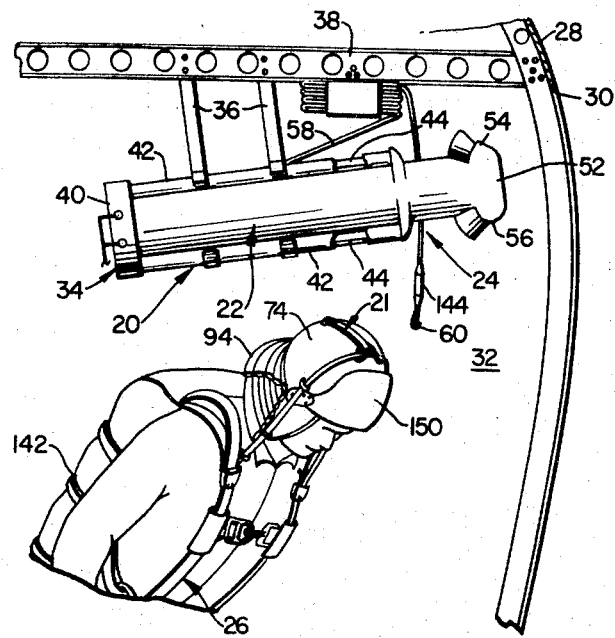
FIG. 1 is a sectioned, fragmentary perspective view showing the escape rocket in its stowed position in the aircraft and the man wearing the head restraint device of this invention and positioned for hook-up to the rocket towline.

Referring now to the drawings and more particularly to FIG. 1, the escape apparatus for forcibly removing an occupant, such as a crewman, from an aircraft or other vehicle and incorporating the head restrain device of this invention is generally indicated at 20. The head restraint device is generally indicated at 21. Apparatus 20 comprises a tractor type rocket 22 which is connected by a motion-transmitting, extendible, flexible pendant or towline assembly 24 to a suitable harness 26 that is worn by the man. Prior to use, rocket 22 is stowed in the vehicle which, by way of example, is shown to be an aircraft 28 having a lateral or side egress opening 30 (see also FIG. 4).

Rocket 22 may be stowed in a crew or passenger compartment 32 of aircraft 28 as shown. Opening 30 may be closed by an unshown door that is removed prior to initiating an escape. Removal or opening of the unshown door may be effected either manually or automatically in the manner described in the above-identified U.S. Pat. No. 3,361,397. Rocket 22 may be of the same construction as described in the first embodiment of the above-identified U.S. Pat. No. 3,424,409.

A rocket launcher 34, (see FIGS. 1 and 6), forming a part of apparatus 20, may be of the same construction as described in the first embodiment of U.S. Pat. No. 3,424,409. As will be described in greater detail shortly, launcher 34 is operative to ballistically launch rocket 22 for flight along a path passing opening 30 and in a lateral direction relative to aircraft 28.

As shown in FIG. 1, the assembly of rocket 22 and launcher 34 is supported in compartment 32 by suitable brackets 36. Brackets 36 may rigidly be fixed to a suitable structural member 38, such as a bulkhead, which forms a part of aircraft 28.

As fully described in U.S. Pat. No. 3,424,409, launcher 34 comprises a rigid housing 40 which mounts a pair of launching tubes 42 on diametrically opposite sides of rocket 22. Rocket launching push rods 44 are slidably received in launching tubes 42 and are detachably engaged with rocket 22 to support rocket 22 in its stowed position. Launching tubes 42 are rigidly fixed to brackets 36 and to housing 40.

Unshown conventional cartridges mounted in housing 40 and forming a part of launcher 34 are ignited by a conventional firing mechanism 48 (see FIG. 6). Firing mechanism 48 is actuated to ignite the rocket launcher cartridges by pulling an escape initiation handle 50 (FIG. 6). The expanding gases generated by ignition of the rocket launcher cartridges pass into launching tubes 42 and act on the inner ends of push rods 44 to forcibly catapult the assembly of rocket 22 and push rods 44 along the line of flight in which rocket 22 is aimed.

Figure 3:
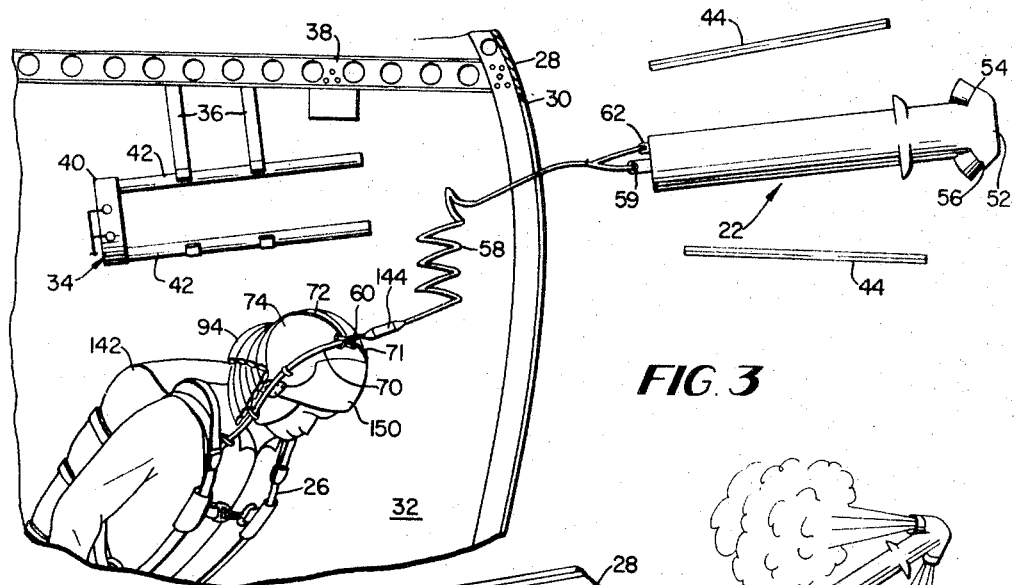
FIGS. 3, 4 and 5 are perspective views illustrating different stages of the escape mode with the escape system and head restraint device of FIG. 1.

As best shown in FIGS. 1 and 3, rocket 22 comprises a nozzle assembly 52 which is mounted on the forward or advancing end of the rocket casing and which comprises a hollow nose cap housing having a pair of rearwardly and outwardly directed nozzles 54 and 56. The gases generated by burning propellant stored within the rocket casing are exhausted through nozzles 54 and 56 to effectively pull rocket 22 through the air.

Head restraint device 21 and a pendant or towline 58 both form a part of assembly 24. One end of towline 58 is connected to a swivel joint 59 (FIG. 3) which is mounted on the aft end of rocket 22 opposite from nozzles 54 and 56. The other end of towline 58 terminates in a hook-type fitting 60 and is detachably connected to head restraint device 21 by fitting 60. Head restraint device 21 provides a motion transmitting connection between towline 58 and harness 26 in a manner to be described in detail later on.

To initiate an escape with the apparatus thus far described, the man hooks his head restraint device 21 to towline 58 by means of fitting 60 and positions himself in opening 30 after the unshown door is removed to permit an unobstructed egress from the aircraft. He then pulls handle 50 to launch rocket 22 in an unignited condition from its stowed position in compartment 32. Rocket 22 may be mounted so that its launching path is upwardly inclined at an acute angle relative to a horizontal plane. For this mode of escape, the man may be required to kneel in opening 30 so as to be below the launch path of rocket 22. The launching flight path of rocket 22 passes through opening and laterally away from the aircraft as shown in FIG. 3.

The unignited flight of rocket 22 through opening 30 and away from aircraft 28 extends towline assembly 24. As the towline assembly approaches its extended condition where it becomes taut to provide a tensioned, motion-transmitting condition between rocket 22 and the man, it actuates a firing mechanism 62 (FIG. 3) which forms a part of the rocket. Actuation of firing mechanism 62 causes the ignition of the rocket propellant. Firing mechanism 62 and the manner in which it causes ignition of the main body of rocket propellant are fully described in the previously mentioned U.S. Pat. Nos. 3,424,409 and 3,361,397.

Figure 4:
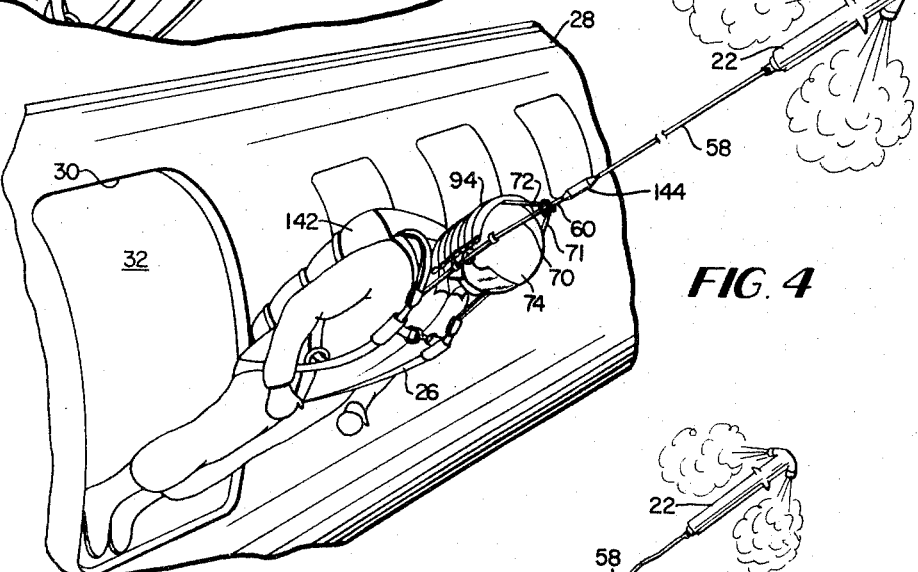

As a result of igniting the rocket propellant, rocket 22 continues its flight away from aircraft 28 (see FIG. 4). The ignited rocket extraction force exerted through the now tensioned towline assembly 24 is applied to harness 26 and thus to the man to extract or pull the man through opening 30 and away from the aircraft along the flight path of the rocket. The man will trail remotely behind rocket 22 as it flies away from the aircraft as fully described in U.S. Pat. No. 3,424,409.

As shown in FIGS. 2–4 and 7–9, head restraint device 21 comprises a pair of flexible, extendible head restraint straps 64 and 66 and a rigid metal hook-up ring 68. Straps 64 and 66 may be made of nylon or other suitable tough, durable, flexible material.

Figure 2:
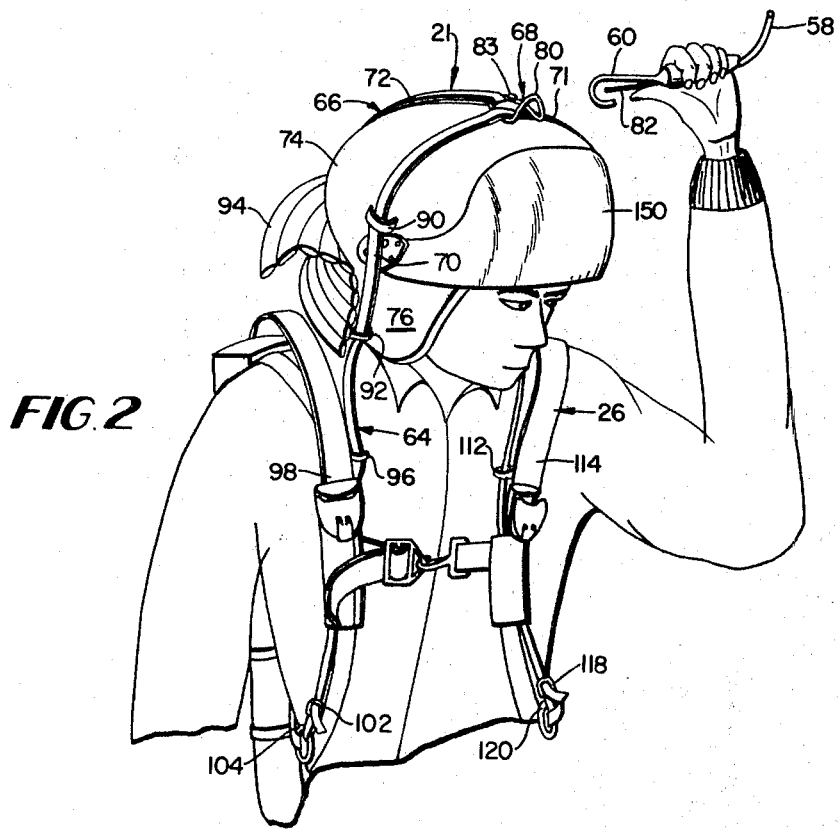
FIG. 2 is a fragmentary perspective view showing the crewman in the act of hooking up the rocket towline to the head restraint device of this invention.

The head restraining portions of strap 64 are indicated at 70 and 71, and the head restraining portion of strap 66 is indicated at 72. When head restraining strap portions 70–72 are relaxed as shown in FIG. 2, ring 68 centrally seats on top of the crewman's protective helmet which is indicated at 74. Helmet 74 is of conventional configuration and has left and right ear-covering portions 76 (FIG. 2) and 77 (FIG. 8). In preparation for an escape, fitting 60 is clipped on to a portion 80 of ring 68. Portion 80 is bent upwardly from the top of helmet 74 to permit easy and quick engagement of fitting 60 with ring 68. As shown, fitting 60 has a leaf spring keeper 82 that prevents inadvertent disengagement of fitting 60 upon being latched to ring 68.

A suitable leaf spring retainer clip 83, which is secured to helmet 74, releasably retains hook-up ring 68 in a centered position on top of helmet 74 when strap portions 70-72 are relaxed.

As shown in FIGS. 2 and 8, strap portions 70 and 71 extend along the opposite ear-covering sides of helmet 70, and strap portion 72 extends along the back of helmet 74 which covers the back of the man's head down to about the nape of his neck.

As shown in FIG. 2, an intermediate portion of strap 64 is looped through hook-up ring 68 at the top of helment 74. From ring 68, the part of strap 64 defining head restraint portion 70 extends downwardly along the side of helmet 74 and between the legs of a rigid, generally U-shaped strap retainer and guide member 90 which is fixed to the right-hand side of helmet 74 in the region that is just above the man's right-hand ear. From member 90, strap 64 extends downwardly along the ear-covering portion 76 of helmet 74 and is routed through a cloth loop 92 which is sewn to the right-hand edge of a protective, padded collar 94.

From loop 92, strap 64 is routed downwardly through a metal guide ring 96 which is secured to the right-hand chest strap 98 of harness 26 at the chest fitting of the harness. From ring 96, strap 64 passes downwardly through a guide tunnel 100 (FIG. 9) which is formed on the inner side of chest strap 98. From tunnel 100, strap 64 is routed downwardly to the region of the man's right-hand hip where it is reeved through a suitable adjustment fitting 102, looped through a hip retainer fitting 104 and then reeved back through adjustment fitting 102.

Fitting 102 may be of any suitable type for adjusting the effective length of strap 64. Retainer fitting 104 may be in the form of a ring which is secured to the man's harness 26 in the region of the intersection of chest strap 98 and a horizontal back strap 106 (see FIGS. 7 and 9) of harness 26 at the man's hip. Fitting 102 secures one end of strap 64 in the form of a loop which is routed through fitting 104. One end of strap 64 is thus anchored or secured to fitting 104, and fitting 104 is, in turn, secured to harness 26.

Referring to FIGS. 2 and 8, the other half of strap 64 extends from hook-up ring 68 and is routed downwardly along the left-hand side of helmet 74 between the legs of another rigid, generally U-shaped strap retainer and guide member 108. Member 108 is fixed to helmet 74. From member 108, strap 64 is routed downwardly along the ear-covering portion 77 of helmet 74 and is routed through a cloth loop 110 which is sewn to the left-hand edge of collar 94. From loop 110, strap 64 is routed downwardly through another metal guide ring 112 which is secured to the left-hand chest strap 114 of harness 26 at the left-hand chest fitting of the harness.

From ring 112, strap 64 is routed downwardly through a guide tunnel 116 (see FIG. 9) which is formed on the inner side of chest strap 114. From tunner 116, the left-hand end of strap 64 is routed downwardly into the region of the man's left hand hip and is reeved through another adjustment fitting 118. From adjustment fitting 118, the left-hand end of strap 64 is looped through another retainer fitting 120, then back over itself and is finally reeved back through fitting 118.

Adjustment fitting 118 may be of the same type as fitting 102 for adjusting the effective length of strap 64. Retainer fitting 120 may be the same as fitting 104 and is secured to harness 26 in the region of the intersection of chest strap 114 and back strap 106 at the man's left hip. The left, looped end of strap 64 is thus secured or anchored to fitting 120, and fitting 120 is, in turn, secured to harness 26.

As best shown in FIG. 7, one end of strap 66 is suitably secured or anchored to fitting 104. From fitting 104, strap 66 is routed upwardly along the man's back and is reeved through an adjustment fitting 122 at the center of the man's back. Fitting 122 is secured to harness 22 at the intersection of the diagonal back straps 124 and 126 of harness 26. From fitting 122, strap 66 is routed upwardly and centrally along the man's spinal region through a tunnel 128 in collar 94. The lower end of tunnel 128 opens at the rearwardly facing side of collar 194 and the upper end of tunnel 128 opens at the forward face of the collar as indicated at 130 in FIG. 8.

Strap 64 emerges from the upper end of tunnel 128 and is routed upwardly and centrally along the back of helmet 70 and between the legs of a further rigid, generally U-shaped strap retainer and guide member 132. Guide member 132 is fixed to helmet 74. From guide member 132, strap 66 is looped through ring 68 and is then routed downwardly in overlapping relation to itself along the back of helmet 74. Strap 66 again is passed through member 132 and is then routed back through tunnel 128. From tunnel 128 strap 66 is again reeved through fitting 122. From fitting 122, strap 66 is routed downwardly along the man's back to the region of his left-hand hip. There, the end of the strap is suitably secured or anchored to fitting 120. The head restraint portion 72 of strap 66 is defined by the overlapping strap portion extending between ring 68 and the lower end of collar tunnel 128.

From the foregoing description it will be appreciated that the assembly of straps 64 and 66 provides a motion transmitting connection between one end of towline 58 and harness 26 in the region of the man's hips.

Guide members 90, 108, and 132 confine the head restraint portions 70-72 of straps 64 and 66 against lateral movement as well as movement away from helmet 74, but permit and guide longitudinal movement of the head restraining strap portions along the helmet. Movement of the head restraining strap portions 70-72 relative to helmet 74 is therefore essentially confined to a direction extending essentially longitudinally of the man's head.

Retainer members 90 and 108 are disposed symmetrically on opposite sides of a vertical plane medially intersecting helmet 74, and retainer member 132 is medially intersected by this vertical plane. Thus, the head restraining strap portions 70-72 are symmetrically oriented with strap portions 70 and 71 being symmetrically positioned by retainer members 90 and 108 and by ring 68 on opposite sides of a vertical plane medially intersecting helmet 74, and with head restraining portion 72 being positioned by retainer member 132 and ring 68 so that it is substantially medially intersected by the vertical plane mentioned above.

Flight of rocket 22 away from the aircraft extends towline 58 and straps 64 and 66 to their motion transmitting, taut conditions as shown in FIG. 4. The head-restraining strap portions 70–72 will be extended or deployed to their head-restraining taut conditions in a direction extending longitudinally of the man's head. Straps 64 and 66, including their head-restraining portions 70–72, will be retained in their taut condition by the continued ignited flight of rocket 22 away from the aircraft.

In their taut condition, strap portions 70–72 extend longitudinally of the man's head and remain in contact with the exterior helmet 74. Thus, srap portions 70 and 71, upon being extended to their head-restraining taut conditions, support the man's head against sideward motion in either direction, and strap portion 72, upon being extended to its head-restraining taut condition, supports the man's head against rearward motion.

It will be appreciated that strap portions 70–72 as held taut by rocket 22, during its flight from the aircraft, to provide the desired restraint for opposing rearward and sideward motion of the man's head under the influence of the airloads that are encountered as the man emerges from the aircraft and is pulled away from the aircraft by the ignited flight of the rocket. By interconnecting strap portions 70–72 with hook-up ring 68, portions 70–72 form a partial cage around the man's head, thus firmly restraining it against sideward or rearward motion. By routing strap portions 70–72 respectively through retainer members 90, 108 and 132, strap portions 70–72 are retained in their proper head-restraining positions, and helmet 74 is firmly located inside of the partial case that is defined by portions 70–72.

Collar 94 is flexible and padded and is stowed in a relaxed, rearwardly folded condition behind the man's head. Collar 94 extends down to his shoulders and partially around the sides of helmet 74. Collar 94 is detachably secured by suitable fasteners 140 to the cover of the man's back type parachute pack 142. A short strip 94a, which may be of suitable elastic material, is sewn or otherwise suitably secured to collar 94 and strap 66 in the manner shown. When strap 66 and collar 94 are relaxed as shown in FIG. 8, strip 94a is relaxed.

Figure 5:
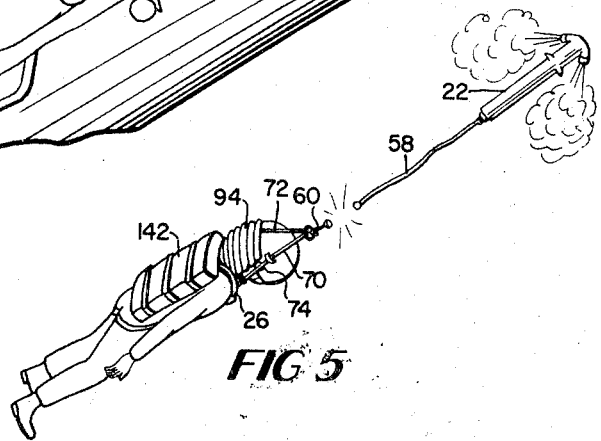

When strap 66 is in its relaxed, untension condition collar 94 is in its relaxed, rearwardly folded condition as shown in FIGS. 1 and 2. When strap 66 is pulled taut, it will pull strip 94a taut too, erect collar 94 to its relatively high, head supporting position as shown in FIGS. 4, 5 and 7. Strap 66 is slidable in tunnel 128. Collar 94 will be held in its erected position by the tautness of strip 94a to thus provide further support for restraining rearward motion of the man's head when strap portions 70–72 are extended to their tensioned head-restraining conditions. Upon being erected, therefore, collar 94 provides a firm support for the man's neck and the back of his head.

By routing strap portions 70 and 71 respectively through loops 92 and 110, collar 94 will be held in a contoured position curving partially around the man's head to thus provide an additional head-restraining support in regions at the sides of the man's neck and head. Collar 94 furthermore is effective to prevent entanglement between head restraint straps 64 and 66 and the unshown pilot parachute and risers of pack 142 when they are released after ground landing.

When push rods 44 clear launching tubes 42, they separate from rocket 22 as shown in FIG. 3. Rocket 22 has sufficient propellant to pull the man a safe distance away from the aircraft or other vehicle.

After the man is pulled clear of the aircraft by the ignited flight of rocket 22, towline 58 is severed by any suitable means to disconnect the man from rocket 22 as shown in FIG. 5. At this stage rocket 22 has sufficient propellant to fly a safe distance away from the man and his parachute when it is deployed.

Towline 58 may be severed in the manner described in the above-identified U.S. Pat. No. 3,361,397. As disclosed in this patent, a fuse (not shown) extending along towline 58 is ignited by a primer inside of rocket 22 just prior to burn-out of the rocket propellant. The fuse ignites a suitable charge that may be housed at 144 (FIG. 1) at the hook-up end of towline 58. It will be appreciated that any suitable disconnect may be employed for freeing the man from rocket 22 at the proper time.

After the man is disconnected from rocket 22, straps 64 and 66 and collar 94 become relaxed to restore mobility to the man's head and neck. In their stowed positions, strap portions 70–72 are sufficiently relaxed and collar 94 is so arranged as not to hinder neck and head mobility or to impair the man's vision.

It will be appreciated that strap 64 is slidable in tunnels 100 and 116.

Figure 10:
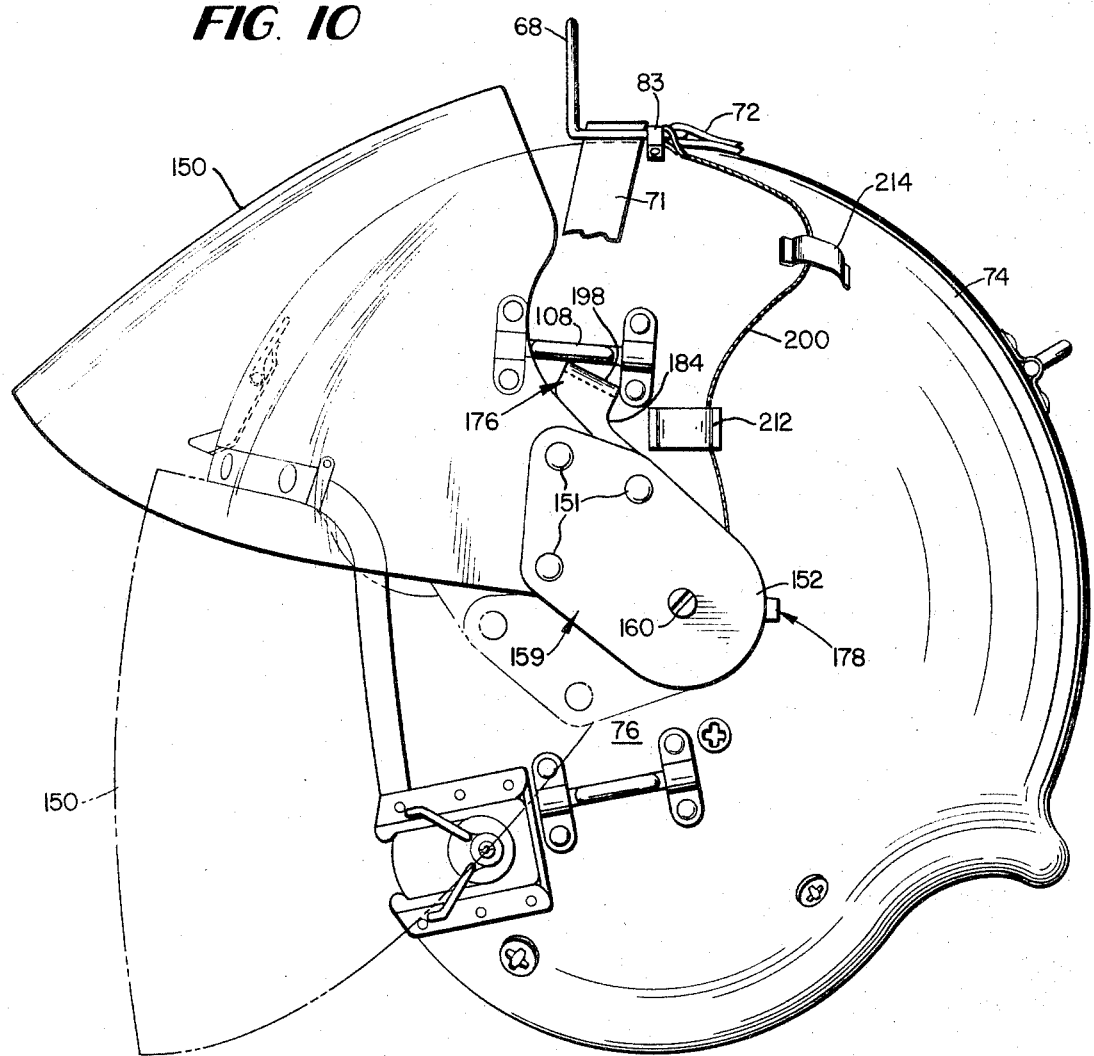
FIG. 10 is a left hand side elevation of the crewman's helmet and head restraint apparatus which is shown in FIGS. 1-5 and 7-9.

Shown in FIGS. 1 and 10, helmet 74 is provided with a visor or eye-shield 150 of suitable, conventional construction. Visor 150 is mounted on helmet 74 for swinging movement between its retracted position, which is shown in FIGS. 1 and 10, and its lowered, eye-shielding position, which is shown in FIG. 4.

Figure 11:
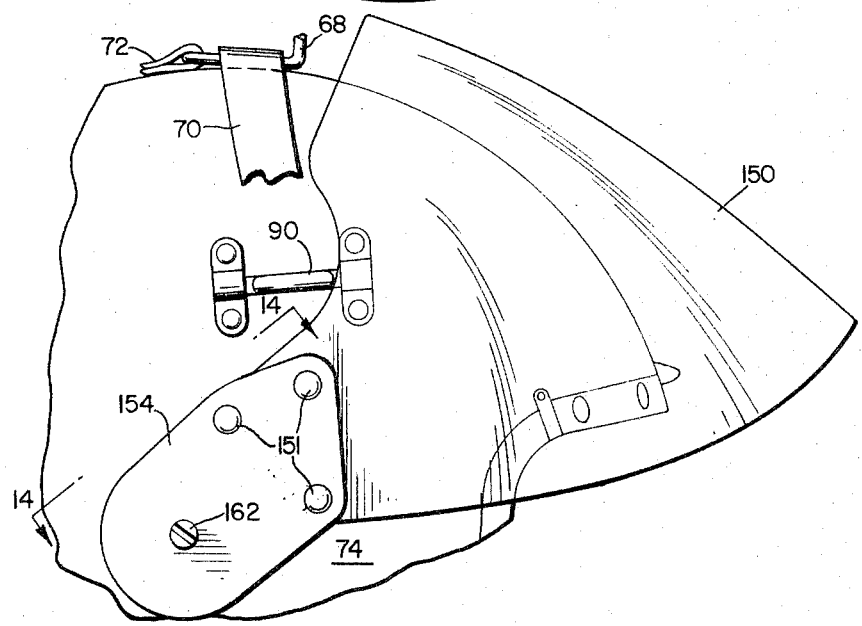
FIG. 11 is an enlarged, fragmentary right hand side elevation of the helmet and head restraint apparatus shown in FIG. 10.

As shown in FIGS. 10 and 11, visor 150 is fixed by rivets 151 or the like to mounting plates 152 and 154 which are respectively disposed on the left-hand and right-hand sides of helmet 74. Mounting plates 152 and 154 are respectively pivotally mounted on screw mounted bushings 156 (FIG. 13) and 158 (FIG. 14). The assembly of visor 150 and mounting plates 152 and 154 is indicated at 159 in FIG. 10.

Bushings 156 and 158 are co-axially mounted on screws 160 and 162 respectively. Screws 160 and 162 are threaded into axially aligned tapped bores that are formed in the left-hand and right-hand sides of helmet 74. Assembly 159 is therefore pivotally about the axially aligned axes of screws 160 and 162.

A pair of spring cartridges 164 (FIG. 13) and 166 (FIG. 14) are provided for biasing assembly 159 to its lowered, eye-shielding position. Cartridge 164 comprises a casing 168 and a helical spring 170 (see FIG. 12). Casing 168 is fixed on bushing 156. Spring 170 is secured at one end to mounting plate 152 and is anchored at the other end to casing 168.

Cartridge 166 is of the same construction as cartridge 164, like reference numerals being applied to designate like parts of cartridge 166. The casing 168 of cartridge 166 is fixed on bushing 158 (see FIG. 14), and the spring 170 of cartridge 168 is secured at opposite ends to plate 154 and the casing of cartridge 168.

The springs 170 of cartridges 164 and 166 thus yieldably bias visor 150 from its raised position to its lowered position.

According to a further feature of this invention, a releasable latch mechanism 174 is provided for releasably latching visor 150 in its raised position. Latch mechanism 174, as will be described in detail, is effective upon the extension of strap portions 70–72 to their head-restraining taut conditions to release visor 150 for displacement to its lowered, eye-shielding position under the bias exerted by springs 170.

As shown in FIGS. 12 and 13, latch mechanism 174 comprises a latch 176 and a retainer 178. Latch 176 and retainer 178 are formed from rigid, flat sides plates.

As shown in FIGS. 12 and 15, latch 176 is disposed on the inwardly facing side of mounting plate 152 and is pivotally mounted on a rivet 180 for rocking motion about an axis that is parallel to, but spaced apart from the axially aligned axes of screws 160 and 162. Rivet 180 is fixed to mounting plate 152 and may also be used to fix visor 150 to mounting plate 152 as shown.

A coiled spring 182, having one of its ends anchored to one of the rivets 151 and its other end secured to latch 176, biases latch 176 in a clockwise direction as viewed from FIG. 13.

As best shown in FIG. 12, retainer 178 is non-rotatably mounted on bushing 156 adjacent to the inwardly facing side of mounting plate 152.

Still referring to FIG. 12, latch 176 is integrally formed with two arms 184 and 186 which extends in essentially diametrically opposite directions from the pivot axis of latch 176. The free end of arm 186 is formed with a downwardly extending latching, end portion 188 which is adapted to latch or hook behind a radially extending arm portion 190 of retainer 178. Arm portion 190 has an outer uniformly diametered edge 192 whose center is coincident with the axis of screw 160. The rearwardly facing edge of retainer 178 is indicated at 194 and extends generally radially of the axis of screw 160. End portion 188 of latch 176 has a forwardly facing flat latching face 196 which interfittingly seats against edge 194 when latch 176 is in its illustrated latching position.

When latch 176 is in its illustrated latching position, spring 182 biases latching face 196 into abutment with edge 194, thus latching end portion 188 behind arm portion 190 to releasably retain visor 150 in its raised position against the bias exerted by springs 170.

When latch 176 is in its illustrated, latched position, arm 184 extends slightly above the adjacent portion visor 150 and has a horizontally extending end portion 198 (See FIG. 13) which is exposed for access by the crewman.

In order to manually displace visor 150 to its lowered, eye-shielding position, the crewman presses down on end portion 198 to rotate latch 176 in a counter-clockwise direction (as viewed from FIG. 13) against the bias of spring 182. This counterclockwise rotation of latch 176 raises end portion 188 to a position where it disengages from and clears the rearward edge of 194 of arm portion 190.

Upon unlatching end portion 188 from the retainer arm portion 190, springs 170 will urge visor 150 downwardly to its lowered eye-shielding position. As visor 150 swings downwardly, the end of portion 188 will ride along the forwardly facing edge 192 of retainer 178.

To manually relatch visor 150 in its raised position, the wearer of helmet 74 simply raises visor 150 to thereby swing the assembly of visor 150, plates 152 and 154 and latch 176 in a clockwise direction about the aligned axes of screws 160 and 162. This causes end portion 188 to ride upwardly and rearwardly along edge 192. When end portion 198 rides off the rearward end of edge 192, spring 182 will then become effective to urge latch 176 in a clockwise direction as viewed from FIG. 12 to thereby cause end portion 188 to latch or hook behind the retainer arm portion 190 where face 196 seats against the rearwardly facing edge 194 of arm portion 190. Visor 150 will now be relatched in its raised position as shown in FIG. 13. It will be appreciated that latch 176 is carried by plate 152.

As shown in FIGS. 10, 12, and 16, a flexible, automatic release cable 200 provides a releasable motion transmitting connection between latch 176 and hook-up ring 68. End portion 188 is bifurcated to form a rearwardly, upwardly, and downwardly open slot 202 (see FIG. 16) through which the cable 200 slidably extends. A small ball 204 is fixed to the lower end of cable 200 and releasably seats in a downwardly facing notch 206 which is formed in the downwardly facing edge of the bifurcated region of end portion 188.

One end of a flexible, retainer spring clip 208 is secured to latch 176 in a downwardly opening slot 210. Slot 210 is formed in end portion 188 just forwardly of notch 206. From slot 210, spring clip 208 curves around notch 206 and has a yieldable or flexible free end that seats against the rearwardly facing edge of end portion 188 to trap ball 204.

The width of slot 202 is smaller than the diameter of ball 204. As a result, ball 204 cannot be pulled through slot 202. As will be described in greater detail shortly, tensioning of cable 200 and counterclockwise displacement of latch 176 (as viewed from FIG. 12) urges ball 204 out of notch 206 and into engagement with the free, deflectable end of spring clip 208. Continued tensioning of cable 200 deflects the free end of spring clip 208 rearwardly, thus releasing ball 204 from latch 176 and thereby disengaging cable 200 from latch 176.

As shown in FIG. 10, cable 200 is routed along the exterior of helmet 74 and is freely tunnelled through a pair of spaced apart generally U-shaped retainer and guide members 212 and 214 which are fixed to the left-hand side of helmet 74. Guide members 212 and 214 restrict or confine cable 200 against lateral movement as well as movement away from helmet 74, but permit and guide longitudinal movement of cable 200 to enable it to be deployed or extended to a taut, tensioned motion-transmitting condition.

The upper end of cable 200 is securely fixed to hook-up ring 68 which is seated on top of the helmet as shown. Prior to usage, cable 200 is relaxed and untensioned, there being sufficient slack in cable 200 so as not to deflect ball 204 out of notch 206 until hook-up ring 68 is pulled away from helmet 74.

When cable 200 is in its illustrated relaxed position, ball 204 is confined between spring clip 208 and the opposing notched downwardly facing edge end portion 188. Spring clip 208 thereby prevents release or disengagement of cable 200 from latch 176 when cable 200 is in its illustrated, relaxed position.

When towline 58 is hooked-up to ring 68 in the manner previously described, the flight of rocket 22 away from the crewman extends towline 58 to its tensioned, motion-transmitting condition to lift hook-up ring 68 from its stowed position on top of helmet 74 to extend and tension cable 200 as well as strap portions 70–72. Upon extending cable 200 to its taut, tensioned condition, ball 204 will butt against the downwardly facing edge of notch 206 to cause latch 176 to rotate in a counterclockwise direction (as viewed from FIG. 12) against the bias of spring 182. As a result, end portion 188 will be lifted upwardly relative to the retainer arm portion 190 and will unlatch from arm portion 190 to thereby release latch 176 from retainer 178.

Upon releasing latch 176 from retainer 178, springs 170 will urge assembly 159 in a counterclockwise direction as viewed from FIG. 13 to thereby urge visor 150 to its lowered eye-shielding position.

Upon the unlatching assembly 159, the continued tensioning of cable 200 by the flight of rocket 22 causes ball 204 to unseat from notch 206 and to butt against the free, deflectable end of spring clip 208. As a result, the tension in cable 200 will cause the free end of spring clip 208 to deflect rearwardly and away from the rearward bifurcated end of latch 176 to release ball 204 from confinement and to thereby disengage or release cable 200 from latch 176 as hook-up ring 68 approaches its fully deployed position which is shown in FIG. 7.

The release of cable 200 from latch 176 allows unrestrained displacement of hook-up ring 68 to its fully deployed position without applying any undesirable force to the crewman's helmet. Upon being released from latch 176, cable 200 will remain attached to hook-up ring 68 and will simply loosely dangle from hook-up ring 68.

From the foregoing it will be appreciated that latching mechanism 174, in addition to being capable of being manually unlatched and relatched to provide for selective, manual displacement of visor 150 between its raised and lowered positions, is tripped by the motion that is transmitted by towline 58, hook-up ring 68 and cable 200 to automatically release visor 150 for spring biased displacement to its eye-shielding position upon flight of rocket 22 away from the crewman.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An escape apparatus for removing an occupant from a vehicle and comprising a rocket adapted to be carried by said vehicle for flight away from said vehicle, flexible towline means providing a motion transmitting connection between said rocket and said occupant and being extendible to a taut motion-transmitting condition by flight of said rocket away from said vehicle, said rocket being effective upon flight away from said vehicle to forcibly remove the occupant from said vehicle through the connection provided by the extended towline means, headgear adapted to be worn by said occupant, an eyeshield mounted on said headgear for displacement between a retracted position and an eye-shielding position, and means conditioned by the extension of said towline means to said taut condition for causing said eyeshield to be displaced from said retracted position to said eye-shielding position.

2. The escape apparatus defined in claim 1 wherein said means for causing said eyeshield to be displaced from said retracted position to said eye-shielding position comprises a latching mechanism releasably retaining said eyeshield in said retracted position and motion transmitting means providing a connection between said towline means and said latching mechanism for causing said latching mechanism to release said eyeshield upon extending said towline means to its taut condition, and spring means effective upon the relesae of said eyeshield to bias said eyeshield to said eye-shielding position.

3. In an escape apparatus for removing an occupant from a vehicle, a rocket adapted to be carried by said vehicle for flight away from said vehicle, a flexible towline assembly providing a connection between said rocket and said occupant and being extendible to a taut motion transmitting condition by flight of said rocket away from said vehicle, said rocket being effective upon flight away from said vehicle to forcibly remove said occupant from the vehicle through the connection provided by the extended towline assembly, and a headgear adapted to be worn by the occupant, the improvement comprising flexible means adapted to be anchored to a garment worn by said occupant and forming a part of said towline assembly, said flexible means extending along the exterior of said headgear and being extendible to taut motion transmitting condition along with the remainder of said assembly upon flight of said rocket away from said vehicle, said flexible means being positioned to at least prevent lateral motion of the occupant's head upon being extended to a taut condition, and means positioned on said headgear for restricting motion of said flexible means relative to said headgear, but permitting the extension of said flexible means to its taut motion-transmitting condition.

4. The escape apparatus defined in claim 3 wherein said flexible means comprises a plurality of strap portions which extend along the sides of said headgear and which, when relaxed, generally follow the contour of said headgear.

5. The escape apparatus defined in claim 3 wherein said flexible means comprises a plurality of strap portions which are positioned along the sides and back of said headgear to oppose both lateral and rearward motion of the occupant's head upon extension to a taut motion-transmitting condition.

6. The escape apparatus defined in claim 3 comprising a member positioned on top of said headgear, said flexible means comprising a plurality of flexible strap portions positioned along the sides of said headgear and secured to said member, said towline assembly further comprising a device and a towline, said towline being secured to said rocket at one end and to said device at the other end, and said device being selectively manipulatable to secure said towline to said member.

7. The escape apparatus defined in claim 3 wherein said flexible means comprises a plurality of extendible strap portions which extend longitudinally of the occupant's head and along opposite ear-covering side portions of said headgear.

8. The escape apparatus defined in claim 3 wherein said flexible means comprises a plurality of extendible strap portions extending along opposite ear-covering portions of said headgear and the back of said headgear to oppose rearward as well as lateral motion of the occupant's head upon extension to a taut motion-transmitting condition.

9. The escape apparatus defined in claim 3 wherein an eyeshield is mounted on said headgear for displacement between a retracted position and an eyeshielding position, and wherein means are provided for displacing said eyeshield to said eye-shielding position in response to the extension of said flexible means.

10. An apparatus comprising extendible, flexible means extending along the exterior of a headgear that is adapted to be worn by a man, said flexible means being positioned on said headgear to restrain motion of the man's head in a plurality of directions upon being extended to a taut condition, means positioned on said headgear for restricting motion of said flexible means relative to said headgear but allowing extension of said flexible means to said taut condition, a rocket mounted for flight away from said man, and means providing a motion transmitting connection between said flexible means and said rocket to extend said flexible means to said taut condition and to pull the man through the air upon said flight of said rocket, said flexible means including a plurality of extendible portions extending longitudinally of the man's head and positioned along the sides and rear of said headgear to restrain sideward and rearward motion of the man's head upon being extended to said taut condition.

11. The apparatus defined in claim 10 wherein said means positioned on said headgear guides and restricts motion of said portions to paths along which they are extended by said rocket.

* * * * *